Dec. 19, 1961 A. L. STUIJTS ET AL 3,013,976

METHOD OF PRODUCING ANISOTROPIC FERROMAGNETIC BODIES FROM FERROMAGNETIC MATERIAL HAVING A NON-CUBIC CRYSTAL STRUCTURE

Filed May 29, 1957

3 Sheets-Sheet 1

INVENTOR
ANDREAS LEOPOLDUS STUIJTS
HENRICUS PETRUS JOHANNES WIJN
BY
Frank R. Jufari
AGENT INVENTOR
ANDREAS LEOPOLDUS STUIJTS
HENRICUS PETRUS JOHANNES WIJN
BY Frank R. Jeffries
AGENT Dec. 19, 1961 A. L. STUIJTS ET AL 3,013,976

METHOD OF PRODUCING ANISOTROPIC FERROMAGNETIC BODIES FROM FERROMAGNETIC MATERIAL HAVING A NON-CUBIC CRYSTAL STRUCTURE

Filed May 29, 1957

3 Sheets-Sheet 3

INVENTOR
ANDREAS LEOPOLDUS STUIJTS
HENRICUS PETRUS JOHANNES WIJN

BY Frank R. Jifari
AGENT

United States Patent Office 3,013,976
Patented Dec. 19, 1961

3,013,976

METHOD OF PRODUCING ANISOTROPIC FERROMAGNETIC BODIES FROM FERROMAGNETIC MATERIAL HAVING A NON-CUBIC CRYSTAL STRUCTURE

Andreas Leopoldus Stuijts and Henricus Petrus Johannes Wijn, both of Eindhoven, Netherlands, assignors to North American Philips Company Inc., New York, N.Y., a corporation of Delaware Filed May 29, 1957, Ser. No. 662,386
Claims priority, application Netherlands June 2, 1956
8 Claims. (Cl. 252—62.5)

Figure 1:
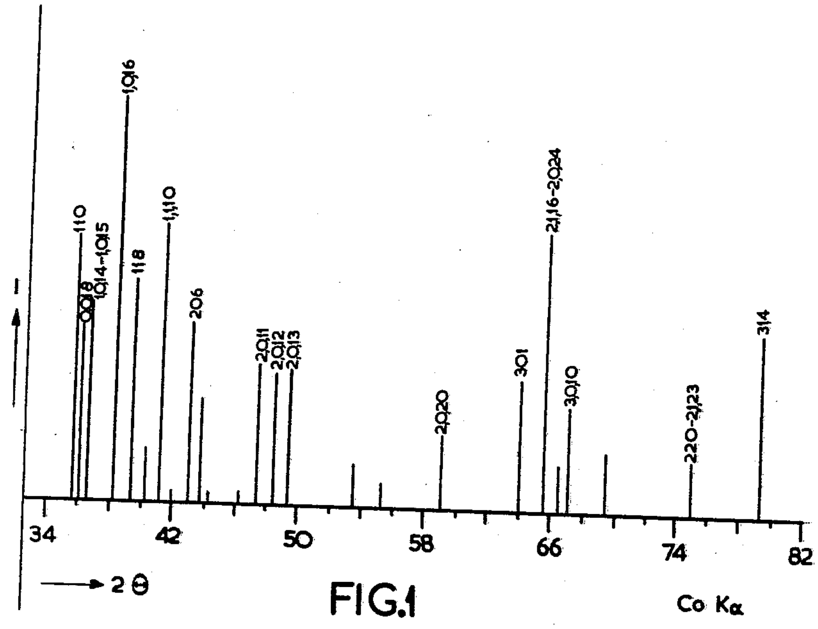

This invention relates to ferromagnetic bodies and in particular to anisotropic ferromagnetic bodies, to ferromagnetic bodies having at least one preferential direction of magnetization in which the magnetic initial permeability exceeds that in other directions and to ferromagnetic bodies having a preferential plane of magnetization in which the magnetic initial permeability exceeds that in other directions.

The present invention will be specifically described in connection with the manufacture of bodies having anisotropic, soft-magnetic properties from ferromagnetic oxides. As compared with the isotropic, but otherwise equal bodies, the initial permeability $\mu_0$ (see R. Becker and W. Döring, "Ferromagnetismus," 1939, page 7) at room temperature is increased in certain directions. The method in accordance with the invention is applied to particles of ferromagnetic compounds having a non-cubic crystal structure, the monocrystals of which show a preferred plane of magnetization. The term "preferred plane" is explained as follows:

In ferromagnetic materials of hexagonal crystal structure, the crystal anisotropy is given as a first approximation by the expression:

$$F_K = K_1' \sin^2 \vartheta \qquad (1)$$

(see R. Becker and W. Döring, "Ferromagnetismus," 1939, page 114). When for a crystal $K_1'$ is positive (so-called "positive" crystal anisotropy), the hexagonal axis is the preferred direction of magnetization in that crystal. If, however, $K_1'$ is negative (this condition will hereinafter be referred to as "negative" crystal anisotropy), this means that the spontaneous magnetization is at right angles to the hexagonal axis and consequently parallel to the basal plane of the crystal. In addition, there is the possibility that the magnetic energy of the crystal depends upon the direction of the spontaneous magnetization of this basal plane. When these energy variations are small as compared with those expressed in Formula 1, the basal plane is referred to as the "preferred plane" of the magnetization. In this case, the direction of the spontaneous magnetization in each crystal lies in the basal plane and in this plane the magnetization can be rotated more readily than in a direction which does not lie in this plane.

In order to decide whether in a specific case crystals having a preferred plane of magnetization are involved, use may, for example, be made of the following identification test:

A small amount, for example 25 milligrams, of the crystal material to be tested is mixed as a fine powder with a few drops of a solution of an organic binder or adhesive in acetone and the mixture is spread evenly on a glass plate. Each particle of the powder should possibly have only a single crystal orientation. The plate is arranged between the poles of an electromagnet so that the lines of magnetic force are at right angles to the surface of the plate. By slowly increasing the direct electric current of the electromagnet, the magnetic field strength is increased so that the powder particles, if they have a preferred plane of magnetization, rotate in the field so that the preferred plane of magnetization is substantially parallel to the direction of the lines of magnetic force. By proceeding carefully, coagulation of the powder particles can be avoided. After the acetone has been evaporated, the powder particles adhere to the glass surface in a magnetically oriented condition. With the aid of radiographs it can now be ascertained whether the desired orientation of the powder particles is really produced by the action of the magnetic field. For this purpose, use may be made, for example, of an X-ray diffractometer (for example an apparatus as described in Philips Technical Review, 16, pages 123–133, 1954—1955). It has been found, that the ratios between the intensities of the reflections at the planes appertaining to a single zone and the intensities of the reflections at the planes not appertaining to said zone, in an oriented specimen are higher than the corresponding ratios in a non-oriented specimen.

As has been mentioned hereinbefore, the present invention relates to a method of manufacturing bodies from ferromagnetic materials the monocrystals of which have a non-cubic structure and a preferred plane of magnetization. This method is characterized in that the particles of a powder of a given ferromagnetic material, which have a certain degree of freedom of movement relative to one another, are aligned in a magnetic field, united together and sintered to compactness. The desired effect is stronger in proportion as a greater fraction of the powder consists of particles having only a single crystal orientation. Such a powder will be called finely-divided. By the use of the measure described hereinbefore the initial permeability in the direction of the magnetic field is increased, in many cases even appreciably increased, as compared with bodies during the manufacture of which no magnetic field was used. This magnetic field need not be stationary, but may change its direction and/or intensity during the above-described procedure. The particles are preferably fixed by compression, preferably in the presence of the magnetic field. Very satisfactory results are obtained by the use of a magnetic field which can be represented by a vector rotating in a plane. In this event, the initial permeability is increased in each direction in this plane.

The process of uniting the particles together need not necessarily be followed by sintering. It has been found that without sintering an increase in the initial permeability can also be achieved.

Examples of materials to which the invention applies and which can be shaped into bodies having an increased initial permeability with no or substantially no increase in loss factor are:

(*a*) Materials consisting essentially of non-cubic crystals having a composition $$Q_{(1-x)}Ca_xFe^{II}_{2(1-y)}R_{2y}Fe^{III}_{16(1-z)}T_{16z}O_{27}$$

wherein Q is at least one bivalent metal selected from the group consisting of Ba, Sr, and Pb, R is at least one bivalent metal or complex selected from the group consisting of Mn, Co, Ni, Zn, Mg and $$\frac{Li^{I}+Fe^{III}}{2}$$

T is at least one trivalent metal selected from the group consisting of Al and Cr, $$0 \leq x \leq \frac{2}{5},\ \frac{1}{4} \leq y \leq 1 \text{ and } 0 \leq z \leq \frac{1}{5}$$

these materials having a crystal structure, the elemental cell of which can be determined in the hexagonal crystal system by a *c*-axis of about 32.8 A. and an *a*-axis of about 5.9 A., as far as the monocrystals of said materials exhibit a preferred plane of magnetization. These materials and methods of making the same are more fully described in application Serial No. 603,134, filed August 9, 1956, now U.S. Patent No. 2,955,085.

(*b*) Materials consisting essentially of non-cubic crystals having a composition $$Ba_{(3-a-b-c)}Sr_aPb_bCa_cMe_2^{II}Fe_{24}O_{41}$$

in which $Me^{II}$ is at least one bivalent metal selected from the group consisting of $Co^{II}$, $Mn^{II}$, $Fe^{II}$, $Ni^{II}$, $Cu^{II}$, $Zn^{II}$. $Mg^{II}$ and the bivalent metal complex $$\frac{Li^{I}+Fe^{III}}{2}$$

and in which *a* has a value varying from 0 to 1, *b* has a value varying from 0 to 0.6, *c* has a value varying from 0 to 0.3, these materials having a crystal structure the elemental cell of which can be determined in the hexagonal crystal system by a *c*-axis of about 52.3 A. and an *a*-axis of about 5.9 A., as far as the monocrystals of said materials exhibit a preferred plane of magnetization. These materials and methods of making the same are more fully described in application Ser. No. 603,135, filed August 9, 1956, now U.S. Patent No. 2,946,752, and in application Ser. No. 659,516, filed May 16, 1957, now U.S. Patent No. 2,977,312.

(*c*) Materials consisting essentially of non-cubic crystals having a composition $BaMe^{II}Fe_8^{III}O_{11}$, wherein the Ba may be replaced for not more than half by Sr, for not more than one quarter by Ca or Pb or may be replaced by a combination thereof and wherein the $Fe^{III}$ may be replaced by not more than one tenth by Al and/or Cr and wherein $M^{II}$ designates at least one of the bivalent metals of the sequence formed by Mn, Fe, Co, Ni, Cu, Zn and Mg, these materials having a rhombohedral crystal structure, the elemental cell of which can be determined in the hexagonal crystal system by a *c*-axis of about 43.5 A. and an *a*-axis of about 5.9 A., the monocrystals of said materials exhibit the preferred plane of magnetization. These materials and methods of making the same are more fully described in application Ser. No. 603,136 filed August 9, 1956, now U.S. Patent No. 2,946,753.

(*d*) Materials consisting essentially of non-cubic crystals having a composition $$Q_{(1-x)}Ca_xCo_a^{II}Ti^{IV}Fe^{III}_{(12-2a)}O_{19}$$

wherein M is at least one metal selected from the group consisting of barium, strontium, lead and *x* has a value less than 0.4, and *a* has a value between about 1.0 and 1.6, these materials having a hexagonal crystal structure, as far as the monocrystals of said materials exhibit the preferred plane of magnetization. These materials and methods of making the same are more fully described in application Ser. No. 635,614 filed January 23, 1957, now U.S. Patent No. 2,960,471.

Figure 5:
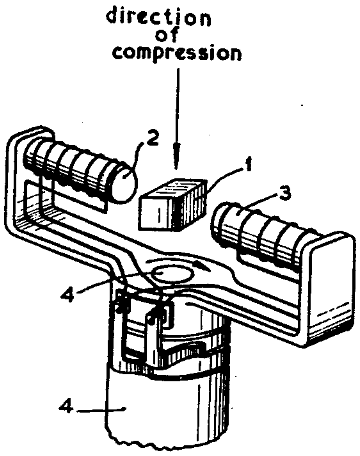
Figure 6:
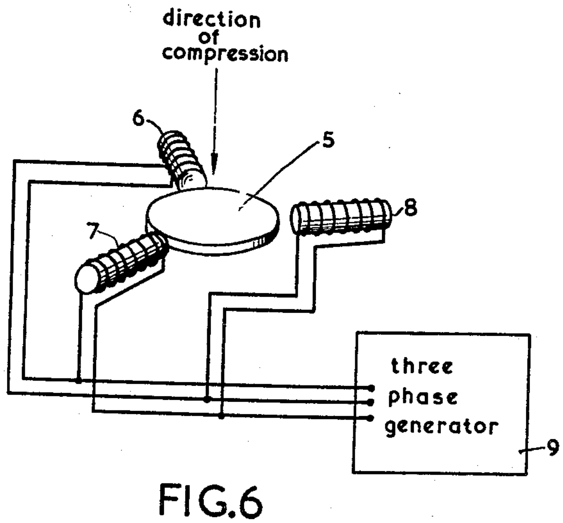

The invention will be described with reference to the accompanying drawing in which FIGS. 1 to 4 are X-ray diffraction diagrams of materials according to the invention and FIGS. 5 and 6 show apparatus for carrying out the method according to the invention.

*Example I*

A mixture of cobalt carbonate, barium carbonate and ferric-oxide in relative proportions according to the formula $Ba_3Co_2Fe_{24}^{III}O_{41}$ was ground with alcohol in a rotating ball mill for 15 hours, subsequently dried and fired in a stream of oxygen at 1050° C. for 2 hours. Subsequently the reaction product was again ground in a rotating ball mill for 15 hours and the powder was again fired in a stream of oxygen for 2 hours at a temperature of 1200° C. 130 gms. of this material was finally ground with alcohol to a powder in a reciprocating ball mill. The crystals of the powder thus produced had a structure, the elemental cell of which can be determined in the hexagonal crystal system by a *c*-axis of about 52.3 A. and an *a*-axis of about 5.9 A.

A sample of the powder was mixed with a solution of nitrocellulose in acetone. The suspension obtained was spread evenly on two glass slides, one of which was arranged between the pole pieces of an electromagnet. The direction of the magnetic field was at right angles to the plane of the slide. The suspensions were dried, after which a radiograph was made of each suspension. The intensity of the radiation (CoK$\alpha$) was weaker in the radiograph of the aligned powder than in that of the non-aligned powder. It was found that the reflections at the planes having the hexagonal axis as the zone-axis compared with the reflections at the planes not appertaining to this zone were stronger in the aligned powder than in the non-aligned powder. Consequently the monocrystals of the powder had a preferred plane of magnetization at right angles to the direction of the (hexagonal) crystallographic main axis.

Figure 2:
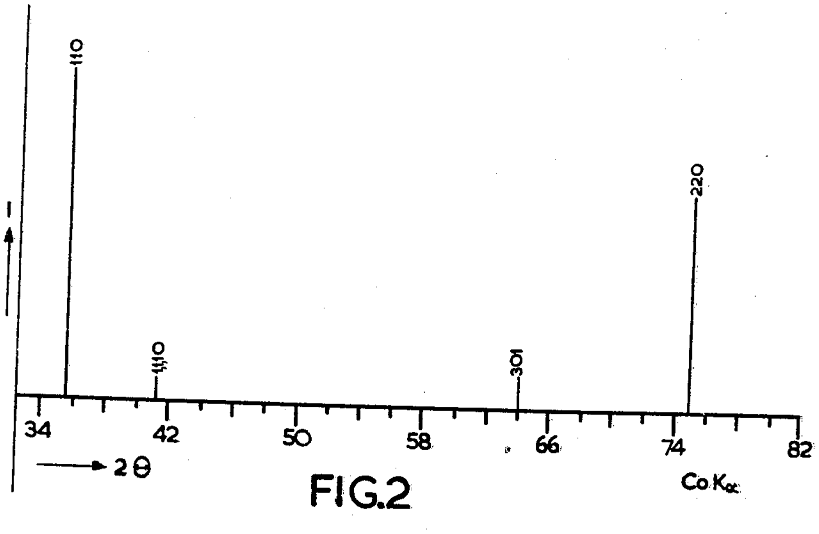

In FIG. 1, the intensity I of the reflections expressed in an arbitrary unit, are plotted as a function of the angle of deflection 2$\Theta$ of the non-aligned powder, while the plane indices (*hkl*) are also shown. FIG. 2 relates to the aligned powder.

From this powder various bodies were made as follows:

(1*a*) Part of the powder was compressed to form a ring without the use of a magnetic field. This ring was fired in an oxygen stream at 1300° C. for 2 hours. Measurements taken on the ring at room temperature and at a frequency of 2 kc./s. revealed an initial permeability $\mu_0$ of 10.4.

(1*b*) Part of the powder was compressed to form a block in a magnetic field which had a field strength of about 3000 oersted and which could be represented by a vector rotating in the plane at right angles to the direction of the compression at a speed of about 1 revolution per second. Apparatus for producing such a rotating field is shown in FIG. 5 in which the material is compressed in vertical direction into a block 1 while a rotating field is produced by coils 2 and 3 rotating at a speed of about 1 revolution per second around the axis 4 and thus creating the effect of a rotating field in the material whose vector lies in a plane perpendicular to the direction of compression. Subsequently the block was fired in an oxygen stream at 1300° C. for 2 hours. From the sintered product obtained a ring was cut, the axis of which was parallel to the direction of compression of the block. On this ring an initial permeability $\mu_0$ of 29.7 was measured at room temperature at a frequency of 2 kc./s. Another block was made in substantially the same manner except that no magnetic field of constant intensity was used but a rotating field which periodically, after an angle of revolution of 90°, showed a maximum value of about 2000 oersted and between these maximum values fell off to zero value. From the sintered product thus obtained a ring was cut the axis of which was again parallel to the direction of compression of the block. This ring had an initial permeability of 21.9 measured at room temperature and at a frequency of 2 kc./s.

(2*a*) Part of the powder was compressed to form a tablet without the use of a magnetic field. After sintering for 2 hours at 1290° C. in an oxygen stream the initial permeability $\mu_0$ of a rod cut from the sintered tablet was measured ballistically at room temperature. The value of $\mu_0$ was found to be about 15 after correction for demagnetization.

(2*b*) Part of the powder was compressed to form a block in a magnetic field which had a field strength of about 3000 oersted and which could be represented by a vector rotating in the plane at right angles to the direction of compression at a speed of about 1 revolution per second. Subsequently the block was sintered in an oxygen stream at about 1290° C. for 2 hours. From the sintered block a rod was cut having its axis at right angles to the direction of compression of the block. The initial permeability $\mu_0$ of this rod, which was measured ballistically at room temperature, was found to be about 30 after correction for demagnetization.

(2c) Part of the powder was compressed to form a tablet in a magnetic field having a field strength of about 5000 oersted which during compression was continuously applied in the direction of compression. The tablet was sintered in an oxygen stream at 1290° C. for 2 hours. From the sintered tablet a rod was cut having its axis parallel to the direction of compression of the tablet. A ballistic measurement made on the rod at room temperature revealed that the initial permeability $\mu_0$ was about 24 after correction for demagnetization.

(3a) Part of the powder was compressed to form a ring without the use of a magnetic field. A measurement made on this ring at room temperature at a frequency of 260 mc./s. showed an initial permeability $\mu_0$ of 2.5. At this high frequency the electromagnetic losses, expressed in a loss factor $$\tan \sigma = \frac{\mu''}{\mu'}$$

(see J. Smit and H. P. J. Wijn, "Advances in Electronics," VI, 1954, page 69, formula nr. 27), were less than 0.05.

(3b) Part of the powder was compressed to form a ring in a magnetic field which had a field strength of about 3000 oersted and which could be represented by a vector rotating in a plane at right angles to the axis of the ring at a speed of about 1 revolution per second. Measurements made on this ring at room temperature at a frequency of 260 mc./s. showed an initial permeability $\mu_0$ of 2.8, the loss factor tan $\sigma$ being less than 0.05.

*Example II*

A mixture of zinc oxide, barium carbonate and ferric oxide in a ratio expressed by the formula $BaZnFe_6^{III}O_{11}$ was ground with alcohol in a rotating ball mill for 15 hours. After drying the mixture was fired in an oxygen stream at 1100° C. for 2 hours. The reaction product was cooled and ground in a mortar, after which the finest fragments were sieved out and ground with alcohol in a reciprocating ball mill for 32 hours.

Figure 3:
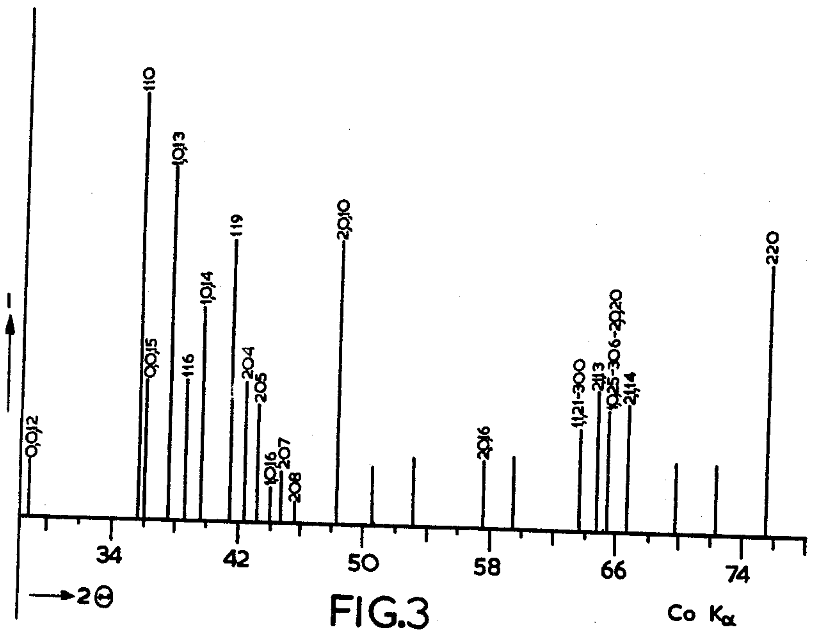
Figure 4:
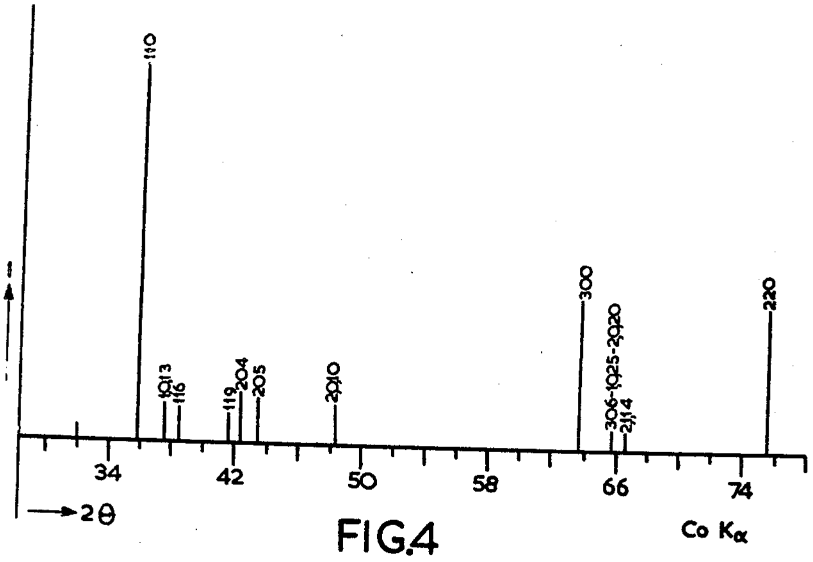

From an identification test of the kind described in Example I, it was found that in the crystals of the compound $BaZnFe_6^{III}O_{11}$ the reflections associated with the planes having the hexagonal axis as the zone axis, when compared with the reflections at the planes not appertaining to this zone, were stronger in the powder the particles of which had been aligned under the action of a magnetic field than in the non-aligned powder. Consequently the crystals had a preferred plane of magnetization at right angles to the direction of the (hexagonal) crystallographic main axis. FIG. 3 shows the X-ray diagram relating to the non-aligned powder and FIG. 4 that of the aligned powder.

Part of the powder was compressed to form a ring without the use of a magnetic field. This ring was fired in an oxygen stream, the temperature being maintained at a highest value of about 1275° C. for about 10 minutes. Measurements made on the ring thus produced at room temperature at a frequency of 1 mc./s. showed an initial permeability $\mu_0$ of 15.8.

Part of the powder was compressed into a tablet in a magnetic field having a field strength of about 3000 oersted which could be represented by a vector rotating in the plane at right angles to the direction of compression at a speed of about 1 revolution per second. The tablet was subsequently fired in an oxygen stream, the temperature being maintained at a maximum value of about 1275° C. for about 10 minutes. From the sintered product obtained a ring was cut having its axis parallel to the direction of compression of the tablet. Measurements taken on this ring at room temperature at a frequency of 1 mc./s. revealed an initial permeability $\mu_0$ of 34.6.

*Example III*

A powder of the compound $BaZnFe_6^{III}O_{11}$ was produced in substantially the same manner as described in Example II, except that it was pre-fired at 1200° C. instead of at 1100° C. This powder was compressed to form two rings which were fired, one having no orientation of the particles and the other having its particles oriented by the application, during compression, of a magnetic field which could be represented by a vector rotating in the plane at right angles to the axis of the ring. Measurements made on the first ring at room temperature at a frequency of 1 mc./s. showed an initial permeability $\mu_0$ of 15.0, measurements of the second ring under equal conditions showed an initial permeability $\mu_0$ of 30.0.

*Example IV*

A powder of the compound $BaZnFe_6^{III}O_{11}$ was produced in about the same manner as described in Exmples II and III, except that now the pre-firing temperature was 1260° C. In the manner described in Example II two rings were made from this powder by compressing the sintering, no magnetic field being used during the compression of the first ring while in pressing the second ring the powder particles were aligned under the action of a magnetic field having a field strength of about 3000 oersted, which could be represented by a vector rotating in a plane at right angles to the axis of the ring at a speed of about 1 revolution per second. Measurements taken on the first ring at room temperature at a frequency of 1 mc./s. showed an initial permeability $\mu_0$ of 12.3. Under equal conditions the second ring was found to have an initial permeability $\mu_0$ of 21.3.

*Example V*

A mixture of barium carbonate, cobalt carbonate, zinc oxide and ferric oxide in a ratio according to the formula $Ba_3CoZnFe_{24}^{III}O_{41}$ was ground in a rotating ball mill with alcohol for 16 hours, dried and pre-fired in an oxygen stream at 1250° C. for 2 hours. The reaction product was ground in a mortar to form grains having a diameter of at the most 0.5 mm. These grains were ground with alcohol in a reciprocating ball mill for 8 hours. The crystals of this powder, which had a structure the elemental cell of which can be determined in the hexagonal crystal system by a c-axis of about 52.3 A. and an a-axis of about 5.9 A., exhibited a preferred plane of magnetization, as could be proved by means of the identification test described hereinbefore.

Part of the powder was compressed to form a ring without the use of a magnetic field. This ring was sintered in an oxygen stream at 1240° C. for 2 hours. Measurements made on this ring at room temperature at a frequency of 155 mc./s. revealed an initial permeability $\mu_0$ of 17, the loss factor tan $\sigma$ being determined as in Example I 3a, and found to be 0.11.

Part of the powder was compressed to form a ring in a magnetic field having a field strength of about 3000 oersted which could be represented by a vector rotating in the plane at right angles to the axis of the ring at a speed of about 1 revolution per second. The ring produced was sintered in an oxygen stream at 1240° C. for 2 hours. Measurements made on the sintered ring at room temperature at a frequency of 155 mc./s. revealed an initial permeability $\mu_0$ of 42 and a loss factor tan $\sigma$ of 0.12.

*Example VI*

From a mixture of barium carbonate, cobalt carbonate, zinc oxide and ferric oxide in a ratio according to the formula $Ba_3Co_{0.8}Zn_{1.2}Fe_{24}O_{41}$, a mixed crystal material was produced in a manner similar to that described in Example V and subsequently pulverized. The crystals of this powder which had a structure of which the elemental cell in the hexagonal crystal system can be determined by a c-axis of about 52.3 A. and an a-axis of about 5.9 A., showed a preferred plane of magnetization, as could be proved by means of the identification test described hereinbefore.

From this powder, rings were made in a manner similar to that described in Example V, one ring without and the other with the use of a magnetic field. Measurements made on the first ring at room temperature at a frequency of 80 mc./s. revealed an initial permeability $\mu_0$ of 24 and a loss factor tan $\sigma$ of 0.08 and at a frequency of 155 mc./s. a $\mu_0$ of 26 and a tan $\sigma$ of 0.21. Measurements made under equal conditions on the second ring, the axis of which was at right angles to the plane in which the magnetic field rotated, showed an initial permeability $\mu_0$ of 57 and a loss factor tan $\sigma$ of 0.10 and a $\mu_0$ of 61 and a tan $\sigma$ of 0.26, respectively.

*Example VII*

A mixture of cobalt carbonate, barium carbonate and ferric oxide in relative proportions according to the formula $Ba_3Co_2Fe_{24}O_{41}$ was ground with alcohol in a rotating ball mill for 18 hours, subsequently dried and fired in a stream of oxygen at 1200° C. for 2 hours. The reaction product was ground with alcohol firstly in a rotating ball mill for 18 hours and subsequently in a reciprocating ball mill for 8 hours. The crystals of this powder exhibited a preferred plane of magnetization.

Part of the powder was compressed into a tablet without the use of a magnetic field.

Part of the powder was compressed into a tablet in a magnetic field having a field strength of about 2000 oersted, which could be represented by a vector rotating in the plane at right angles to the direction of the compression at a speed of 50 revolutions per second. Apparatus for producing such a rotating field is shown in FIG. 6 in which the material is compressed in vertical direction into a tablet 5 while a rotating field is produced by coils 6, 7 and 8 energized from a three phase generator 9, which generates three signals displaced 120° in phase at a frequency of 50 cycles per second. One of the signals is applied to coil 6, the second is applied to coil 7 and the third to coil 8 to create the effect of a rotating field in the material whose vector lies in a plane perpendicular to the direction of compression.

The tablets were subsequently fired in an oxygen stream at 1200° C. for 2 hours. From the sintered products obtained, rings were cut having their axis parallel to the direction of compression of the tablet. Measurements taken on these rings at room temperature at a frequency of 3 mc./s. revealed initial permeabilities $\mu_0$ of 11, 4 and 32.6 respectively.

The methods used and the results obtained in the Examples I–VII are listed in the following table:

While we have described our invention in connection with specific embodiments and applications, other modifications thereof will be readily apparent to those skilled in this art without departing from the spirit and scope of the invention as defined in the appended claims.

What is claimed is:

1. A method of producing a magnetically oriented ferromagnetic body constituted of a material crystallizing in the hexagonal system, the crystals of which each have a preferred plane of magnetization comprising the steps of placing said material in finely-divided form in a magnetic field which can be represented by a vector rotating in a plane while the particles are free to move relative to one another to align the particles, and uniting the particles into a coherent body while under the influence of the magnetic field.

2. A method of producing a magnetically oriented body as defined in claim 1 in which the material has the composition:

$$Q_{(1-x)}Ca_xFe^{II}_{2(1-y)}R_{2y}Fe^{III}_{16(1-z)}T_{16z}O_{27}$$

wherein Q is a metal selected from the group consisting of barium, strontium and lead, R is a bivalent metal ion selected from the group consisting of $Mn^{++}$, $Co^{++}$, $Ni^{++}$, $Zn^{++}$, $Mg^{++}$, and $$\frac{Li^{+}+Fe^{+++}}{2}$$

T is a metal selected from the group consisting of aluminum and chromium, $x$ has a value up to 0.4, $y$ has a value between about 0.25 and 1, and $z$ has a value up to 0.2, the crystals of said material having an $a$-axis of 5.9 A. and a $c$-axis of 32.8 A.

3. A method of producing a magnetically oriented body as defined in claim 1 in which the material has the composition $$Ba_{(3-a-b-c)}Sr_aPb_bCa_cMe_2^{II}Fe_{24}^{III}O_{41}$$

wherein $Me^{II}$ is a bivalent metal ion selected from the group consisting of $Co^{++}$, $Mn^{++}$, $Fe^{++}$, $Ni^{++}$, $Cu^{++}$, $Zn^{++}$, $Mg^{++}$, and $$\frac{Li^{+}+Fe^{+++}}{2}$$

$a$ has a value up to 1, $b$ up to 0.6, and $c$ up to 0.3, the crystals of said material having an $a$-axis of 52.3 A.

4. A method of producing a magnetically oriented body as defined in claim 1 in which the material has the composition:

$$Ba_{(1-a-b-c)}Sr_aPb_bCa_cMe^{II}T_2Fe^{III}_{(6-z)}O_{11}$$

wherein $Me^{II}$ is a bivalent metal ion selected from the

| Material | No magnetic field | Rotating magnetic field of constant intensity | Rotating magnetic field of variable intensity | Stationary magnetic field | Density, gm./cc. | Measurement: frequency | Measurement: $\mu_0$ | Measurement: tan δ | Example |
|---|---|---|---|---|---|---|---|---|---|
| $Ba_3Co_2Fe_{24}O_{41}$ | + | | | | 4.8 | 2 kc./s. | 10.4 | | I, 1*a* |
| | | + | | | 4.0 | 2 kc./s. | 29.7 | | I, 1*b* |
| | | | + | | 4.8 | 2 kc/s. | 21.9 | | I, 1*c* |
| | + | | | | 4.8 | | 15 | | I, 2*a* |
| | | + | | | 4.7 | | 30 | | I, 2*b* |
| | | | | + | 4.8 | | 24 | | I, 2*c* |
| | + | | | | ca 3 | 260 mc./s. | 2.5 | 0.05 | I, 3*a* |
| | | + | | | ca 3 | 260 mc./s. | 2.8 | 0.05 | I, 3*b* |
| $BaZnFe_6O_{11}$ | + | | | | 5.0 | 1 mc./s. | 15.8 | | II |
| | | + | | | 5.0 | 1 mc./s. | 34.5 | | |
| $BaZnFe_6O_{11}$ | + | | | | 5.1 | 1 mc./s. | 15.0 | | III |
| | | + | | | 5.3 | 1 mc./s. | 30.0 | | |
| $BaZnFe_6O_{11}$ | + | | | | 5.0 | 1 mc./s. | 12.3 | | IV |
| | | + | | | 5.2 | 1 mc./s. | 21.3 | | |
| $Ba_3Co_{1.0}Zn_{1.0}Fe_{24}O_{41}$ | + | | | | 4.8 | 155 mc./s. | 17 | 0.11 | V |
| | | + | | | 4.7 | 155 mc./s. | 42 | 0.12 | |
| $Ba_3Co_{0.8}Zn_{1.2}Fe_{24}O_{41}$ | + | | | | 4.8 | 80 mc./s. | 24 | 0.08 | VI |
| | | | | | | 155 mc./s. | 26 | 0.21 | |
| | | + | | | 4.7 | 80 mc./s. | 57 | 0.10 | |
| | | | | | | 155 mc./s. | 61 | 0.26 | |
| $Ba_3Co_2Fe_{24}O_{41}$ | + | | | | 4.7 | 3 mc./s. | 11.4 | | VII |
| | | + | | | 5.0 | 3 mc./s. | 32.6 | | |

group consisting of $Mn^{++}$, $Fe^{++}$, $Co^{++}$, $Ni^{++}$, $Cu^{++}$, $Zn^{++}$, and $Mg^{++}$, *a* has a value up to 0.5, *b* up to 0.25, *c* up to 0.25, the sum of *b* and *c* not exceeding 0.25, T is a metal selected from the group consisting of aluminum and chromium, *z* has a value up to 0.6, the crystals having an *a*-axis of 5.9 A. and a *c*-axis of about 43.5 A.

5. A method of producing a magnetically oriented ferromagnetic body as defined in claim 1 in which the material has the composition:

$$Q_{(1-b)}Ca_bCo_a^{II}Ti_a^{IV}Fe^{III}_{(12-2a)}O_{19}$$

wherein Q is a metal selected from the group consisting of barium, strontium and lead, *a* has a value between 1.0 and 1.6 and *b* a value up to 0.4.

6. A method of producing a magnetically oriented ferromagnetic body constituted of a material crystallizing in the hexagonal system, the crystals of which each have a preferred plane of magnetization comprising the steps of placing said material in finely-divided form in the field of a magnet which rotates in a plane while the particles are free to move relative to one another to align the particles, and uniting the particles into a coherent body while under the influence of the magnetic field.

7. A method of producing a magnetically oriented ferromagnetic body constituted of a material crystallizing in the hexagonal system, the crystals of which each have a preferred plane of magnetization comprising the steps of placing said material in finely-divided form in the field produced by at least three magnets energized by a polyphase current while the particles are free to move relative to one another to align the particles, and uniting the particles into a coherent body while under the influence of the magnetic field.

8. A method of producing a magnetically oriented ferromagnetic body constituted of a material crystallizing in the hexagonal system, the crystals of which each have a preferred plane of magnetization comprising the steps of placing said material in finely-divided form in a magnetic field which can be represented by a vector rotating in a plane while the particles are free to move relative to one another to align the particles, compressing the particles into a body while in the presence of said field, and sintering said body to unite the particles and form a coherent body.

References Cited in the file of this patent

UNITED STATES PATENTS

| | | |
|---|---|---|
| 2,736,708 | Crowley | Feb. 28, 1956 |
| 2,762,777 | Went et al. | Sept. 11, 1956 |
| 2,762,778 | Gorter et al. | Sept. 11, 1956 |
| 2,778,803 | Crowley | Jan. 22, 1957 |
| 2,827,437 | Rathenau | Mar. 18, 1958 |
| 2,837,483 | Hakker et al. | June 3, 1958 |
| 2,847,101 | Bergmann | Aug. 12, 1958 |
| 2,854,412 | Brockman et al. | Sept. 30, 1958 |
| 2,900,344 | Stuyts et al. | Aug. 18, 1959 |

FOREIGN PATENTS

| | | |
|---|---|---|
| 756,383 | Germany | Oct. 20, 1952 |
| 927,259 | Germany | May 2, 1955 |
| 1,094,988 | France | Dec. 15, 1954 |

OTHER REFERENCES

Gorter: Philips Res. Reps., vol. 9, No. 6, pp. 403–418, December 1954.

Philips Technical Review, vol. 13, No. 7, January 1952, pp. 194–208.

Philips Technical Review, vol. 16, No. 5–6, November-December 1954, pp. 141–146.

Philips Technical Review, vol. 18, No. 6, November 1956, pp. 145–154.